March 15, 1955 R. J. ALTGELT 2,704,019
PLOW FRAME
Filed Nov. 22, 1949
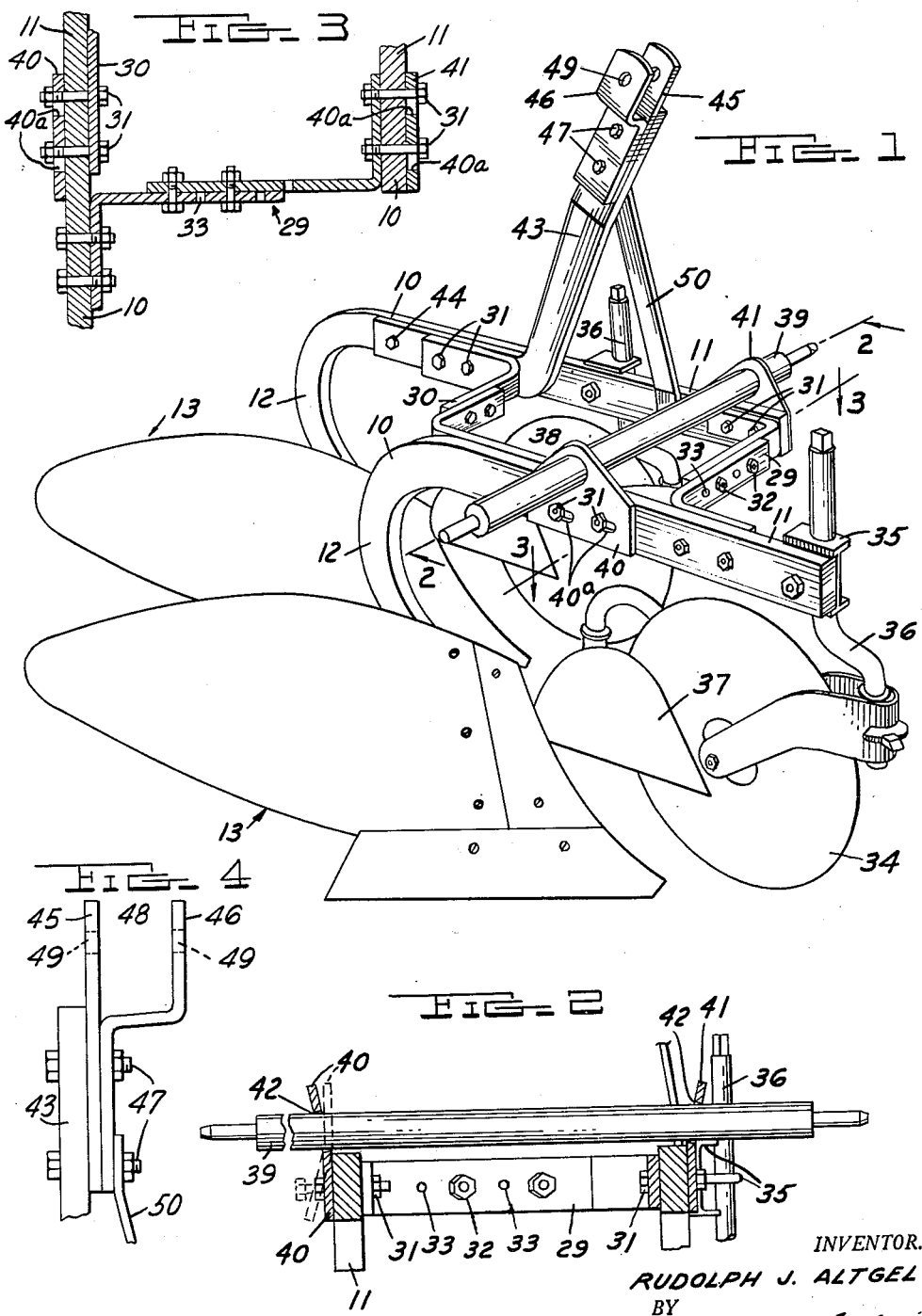
INVENTOR.
RUDOLPH J. ALTGELT
BY
W. A. Schaich
ATTORNEY

United States Patent Office 2,704,019
Patented Mar. 15, 1955

2,704,019

PLOW FRAME

Rudolph J. Altgelt, South Bend, Ind., assignor, by mesne assignments, to Ford Motor Company, Dearborn, Mich., a corporation of Delaware Application November 22, 1949, Serial No. 128,846

2 Claims. (Cl. 97—47.55)

This invention relates to an improved plow frame for use with tractors having power lifted, vertically swingable, trailing hitch links.

Heretofore, the frame construction of the so-called "lift type" plows have been of a relatively complicated and expensive construction. Particularly in the case of two bottom plows, there has been no frame structure utilized which is capable of being interchangeably used with different sizes of plow bottoms. Likewise, "lift type" plows heretofore have incorporated rather intricate and expensive mechanisms for effecting adjustment of the angular position of the plow bottoms relative to the line of draft for varying the width of the furrow produced by the plow.

Accordingly, it is an object of this invention to provide an improved economical plow frame for tractor-carried, "lift type" plows, and particularly an improved frame for a two bottom plow for use with tractors having the well-known three link implement hitch arrangement.

A particular object of this invention is to provide an inexpensive yet convenient arrangement for a "lift type" plow for effecting adjustment of the angular position of the plow bottoms relative to the line of draft for varying the effective width of cut produced by the plow.

Another object of this invention is to provide a two bottom plow frame incorporating adjustable brackets for selectively changing the lateral spacing of the pair of plow beams whereby such beams may be set at a proper spacing to accommodate a plurality of different sizes of plow bottoms.

Still another object of this invention is to provide a selectively positionable connection fork on the plow frame of a "lift type" plow for attachment to the upper link of a three link tractor-implement hitch arrangement, whereby the longitudinal axis of the plow can be maintained in substantial coincidence to the longitudinal axis of the tractor even though different sizes of plow bottoms are mounted on the plow frame.

A further object of this invention is to provide a simplified mechanism for adjustably securing a cross shaft or drawbar to the beams of a lift type plow.

A particular object is to provide a lift type plow construction which permits usage of a cylindrical rod with reduced end portions as the cross shaft or drawbar.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a perspective view of a plow constructed in accordance with this invention.

Figure 2 is a sectional view taken along the plane 2—2 of Figure 1.

Figure 3 is a sectional view taken along the plane 3—3 of Figure 1.

Figure 4 is an enlarged detail fragmentary view of the reversible connection fork member.

As shown on the drawings:

Briefly, this invention comprises a lift type plow frame formed by a pair of generally parallel plow beams which are laterally spaced and secured together by a plurality of braces, such braces being selectively adjustable in length to permit variable spacing of the plow beams to accommodate different sizes of plow bottoms, and a clamping plate of obtuse angular configuration is secured to each of the plow beams in upstanding relationship, and the upstanding portion thereof is apertured to snugly receive a shaft-like drawbar having reduced diameter end portions for connection to the lower links of a well-known three link tractor-implement hitch connection. When the clamping plates are firmly bolted to the plow beams, the drawbar is securely locked to the plow frame. One of the clamping plates incorporates means permitting longitudinal adjustment of its position along its respective plow frame and accordingly, the angular relationship of the plow bottoms with respect to the line of draft may be conveniently adjusted. An upwardly and forwardly sloping arm is rigidly secured to one of the plow beams and a removable fork-like connection element is provided on the top end of such arm to form a connection for the top link of the three link tractor hitch.

Referring particularly to Figure 1, a plow embodying this invention comprises a pair of plow beams 10 which are secured in spaced, parallel, staggered relationship by transverse adjustable brace members, hereinafter described in detail. Plow beams 10 may be conveniently formed by bending operations on rectangular bar stock and include a generally horizontal portion 11 and an integral, downwardly depending curved portion 12 at the rear end of horizontal portion 11.

A conventional plow bottom 13 is secured to each of the depending portions 12 of plow beams 10 by suitable bolts (not shown), as best shown in Figure 1. Plow beams 11 are spaced apart by two pairs of substantially L-shaped brackets 29 and 30 provided respectively at the forward and rear ends of such blow beams. Each of the brackets 29 and 30 are secured to respective plow beams by bolts 31 and each pair of brackets is secured together by bolts 32. A plurality of holes 33 are provided in each pair of brackets 29 and 30 whereby the spacing of beams 11 may be readily increased or decreased to accommodate plow bottoms 13 of greater or lesser size.

As shown in Figure 1, one of the plow beams 11 is advanced substantially ahead of the other in order that the furrow turned by the rearmost plow bottom 13 will not interfere with the forwardly placed plow bottom 13. A swiveling coulter 34 is mounted on the forward end of plow beam 11 by a well-known clamping device indicated at 35. The coulter shaft 36 is provided for mounting the coulter thereon and the usual coulter scraper 37 is suitably mounted adjacent coulter 34. A second coulter 38 is similarly mounted on the other plow beam 11.

A cross shaft or drawbar 39 is provided for attaching the plow to the vertically swingable hitch links (not shown) of a tractor of well-known make. Shaft 39 is mounted on plow beams 11 by a pair of spaced, obtuse, angular clamping plates 40 and 41 as will be described. A pair of spaced slotted holes 40a are provided in each of plates 40 and 41 and bolts 31 utilized to secure the pair of brackets 29 and 30 to beams 11 project through slotted holes 40a to secure the plates to the respective plow beam. A transverse cylindrical hole 42 is provided in the free end of each plate 40 and 41 and shaft 39 is insertable through such holes to mount the shaft in such plates. It should be noted that the free end of each plate 40 and 41 slopes outwardly away from the respective plow beam 11.

Referring to Figure 2, the position of clamping plates 40 and 41 prior to tightening bolts 31 is shown in dotted outline. The axis of holes 42 in each plate 40 and 41 is substantially perpendicular to the plane of the top angular portion of the respective plate, 40 or 41. When slipped onto drawbar 39, the bottom portions of plates 40 and 41 slope away from the plow beams 11. When, however, bolt 31 is tightened, the bottom portion of each plate 40 and 41 is drawn against the respective plow beam 11 whereupon the top portion of each of such plates is moved away from each plow beam, whereby, in effect, the hole 42 for each clamping plate becomes angularly disposed relative to drawbar shaft 39, thereby biting into drawbar 39 to clamp such bar securely in a desired transverse position. Plates 40 and 41 are preferably constructed of a hardenable material so that a spring tension may be imparted to such plates by suitable heat treatment, thus providing resilient plates which will retain their angular shape. The slotted holes 40a, in plates 40 and 41, permit longitudinal adjustment of such plates whereby the angular relationship of shaft 39 with respect to beams 11 may be changed to effect a variation in the width of furrow being turned by the plow bottoms.

An upwardly and forwardly sloping substantially L-shaped arm 43 is secured to rear beam 11 as shown in Figure 1 by bolts 31 and a bolt 44. A brace 50 is secured to arm 43 by one of the bolts 47 and to the forward end of the rear plow beam 11 by a suitable bolt (not shown). Thus brace 50 rigidly supports arm 43 in the extended position shown in Figure 1. A reversible connection fork comprising a straight plate member 45 and an offset plate member 46 is secured to the upper end of arm 43 by a pair of bolts 47. The offset plate member 46 defines an opening 48 which receives the end of the compression link or top link of the tractor hitch (not shown). Opposed holes 49 are provided in each plate 45 and 46 through which may be inserted a linch pin to connect such upper link to the fork defined by the plates 45 and 46. It is readily apparent that plates 45 and 46 may be assembled to the opposite side of arm 43 from that shown in Figure 4 by merely unloosening bolts 47 and assembling such plates on the opposite side.

From the foregoing description, it is clearly apparent that there is here provided a plow construction of simplified design and yet one which possesses great rigidity and strength. The spacing of the plow beams may be adjusted whereby plow bottoms of different sizes may be readily interchanged without requiring a new frame for each set of different sized plow bottoms. The drawbar is of unusually simple and economically manufacturable construction. A positive and simple means for clamping the drawbar in any desired position of lateral adjustment is also provided. Further, such drawbar clamping means is longitudinally adjustable, whereby the effective width of cut of the plows can be conveniently adjusted. Lastly, the center of the plow frame can be kept substantially in alignment with the longitudinal axis of the tractor by selective positioning of the reversible connection fork regardless of the size of the plow bottoms utilized.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A plow for use with a tractor having two transversely spaced hitch links and a top, central positioning link, comprising a pair of plow beams, each beam having a horizontal forward portion with a vertical side wall and a depending rear portion adapted to mount a plow bottom, a transversely extending, adjustable length brace structure connecting said plow beams in laterally spaced, forwardly staggered relationship, the length adjustment of said brace structure thereby permitting more than one size of plow bottom to be accommodated on said beams, a drawbar having end portions shaped for respective engagement with the tractor hitch links, means for securing said drawbar to said beams in transverse relationship therewith in any selected lateral spacing thereof comprising a pair of mounting plates, each mounting plate having a first portion disposed in angular relationship to a second portion, each of said second portions being apertured to snugly receive the medial portions of said draw bar, each of said apertures having a depth axis perpendicular to the plane of said second portion of the mounting plate, bolt means for respectively securing said first portions of the mounting plates to said vertical side walls of said plow beams, thereby exerting a clamping action on said drawbar, at least one of said plates having longitudinally extending slots cooperating with said bolt means to permit the selective longitudinal positioning of one of said plates relative to the other plate, thereby permitting adjustment of the effective width of cut of the plow, an upstanding frame structure secured to said beams and projecting above said beams, a connection element adapted for securement to the tractor top link, and means for selectively attaching said connection element to said upstanding frame structure in any selected one of a plurality of laterally spaced positions whereby the plow may be centered relative to the tractor for any selected size of plow bottoms.

2. In a plow having a pair of spaced plow bottoms, a plow beam secured to each of the plow bottoms, said plow beams each having a substantially vertical side surface, an obtuse angular clamping plate having angularly disposed upper and lower leg portions, said lower leg portions being adapted for mounting on said vertical side surface of each of said plow beams, each of said clamping plates having a hole in said upper leg portion with its depth axis perpendicular to the plane of said upper leg portion, a drawbar snugly insertable in said holes for transverse mounting of said drawbar with respect to said plow beams, and bolt means engageable with said lower leg portion of said clamping plates for respectively securing such portion against said vertical side surfaces of said plow beams and whereby said upper leg portions are moved to clamp said drawbar to said beams in a selected lateral position, and means for adjusting the longitudinal position of one of said clamping plates along said plow beams for changing the angular relationship of said drawbar with respect to said plow beams, thereby adjusting the effective width of cut of the plow bottoms.

References Cited in the file of this patent

UNITED STATES PATENTS

| | | |
|---|---|---|
| 1,233,778 | Harris | July 17, 1917 |
| 1,575,011 | Seaholm | Mar. 2, 1926 |
| 1,670,521 | Ray | May 22, 1928 |
| 1,815,644 | Anderson | July 21, 1931 |
| 1,829,545 | Seaholm | Oct. 27, 1931 |
| 2,179,526 | Strandlund | Nov. 14, 1939 |

FOREIGN PATENTS

| | | |
|---|---|---|
| 982 | Great Britain | Apr. 13, 1871 |
| 599,063 | Great Britain | Mar. 3, 1948 |